US006587134B2

(12) United States Patent
Hartmann

(10) Patent No.: US 6,587,134 B2
(45) Date of Patent: Jul. 1, 2003

(54) CASSETTE FOR THERMAL TRANSFER RIBBON FOR SETTING IMAGES ON PRINTING PLATES

(75) Inventor: Thomas Hartmann, Friedberg (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 0 days.

(21) Appl. No.: 09/851,919

(22) Filed: May 9, 2001

(65) Prior Publication Data

US 2002/0003567 A1 Jan. 10, 2002

(30) Foreign Application Priority Data

May 12, 2000 (DE) ........................................ 100 23 319

(51) Int. Cl.$^{7}$ .......................... B41J 32/00; G01D 15/16
(52) U.S. Cl. ....................................................... 347/214
(58) Field of Search ................................ 347/214, 212, 347/176, 171; 400/206, 208, 206.1

(56) References Cited

U.S. PATENT DOCUMENTS

| | | | | |
|---|---|---|---|---|
| 4,302,118 A | * | 11/1981 | Schaefer | 400/206 |
| 4,329,072 A | * | 5/1982 | Kacmarcik | 400/208 |
| 4,347,007 A | * | 8/1982 | Schaefer | 400/206.1 |
| 4,820,067 A | | 4/1989 | Surti | 400/208 |
| 5,026,181 A | | 6/1991 | Ahn | 400/208 |
| 5,306,097 A | * | 4/1994 | Kaneko | 347/214 |
| 5,418,552 A | * | 5/1995 | Maruyama | 347/214 |
| 5,601,022 A | | 2/1997 | Dauer et al. | 101/467 |
| 6,211,895 B1 | * | 4/2001 | Asabe et al. | 347/212 |
| 6,222,567 B1 | * | 4/2001 | Schuster et al. | 347/171 |
| 6,304,281 B1 | * | 10/2001 | Weichmann et al. | 347/176 |
| 6,384,855 B1 | * | 5/2002 | Miller et al. | 347/215 |

FOREIGN PATENT DOCUMENTS

| | | | |
|---|---|---|---|
| DE | 37 20 561 | 2/1988 | |
| DE | 38 08 603 | 9/1989 | |
| DE | 42 35 930 | 4/1994 | |
| DE | 198 11 030 | 9/1999 | |
| EP | 698 488 | 2/1996 | |
| EP | 1 095 783 | 10/2000 | B41J/17/32 |
| JP | 6165279 | 8/1985 | B41J/32/00 |
| JP | 1022582 | 1/1989 | B41J/32/00 |

OTHER PUBLICATIONS

Article entitled "Magnetbandkassette für Schallaufzeichnung auf Magnetband 4" dated Jun. 1976 published in Alleinverkauf der Norman durch Beuth Verlag Gmbh< Berlin, pp 1–6.

* cited by examiner

*Primary Examiner*—Lamson Nguyen
*Assistant Examiner*—K. Feggins
(74) *Attorney, Agent, or Firm*—Cohen, Pontani, Lieberman & Pavane

(57) ABSTRACT

Cassette for thermal transfer ribbon for setting images on printing plates, having spools to hold the thermal transfer ribbon inside a housing, the spools having some play with respect to the housing of the cassette, and the spools being capable of being positioned with respect to the housing such that neither the spools nor the thermal transfer ribbon touch the housing during spooling operations.

14 Claims, 3 Drawing Sheets

CASSETTE FOR THERMAL TRANSFER RIBBON FOR SETTING IMAGES ON PRINTING PLATES

BACKGROUND OF THE INVENTION

1. Field of the Invention

The invention relates to a cassette for thermal transfer ribbon for setting images on printing plates, the cassette having spoons inside a housing for holding the thermal transfer ribbon.

2. Description of the Related Art

EP 0 698 488 B1 discloses a strip-like transfer foil for setting images on printing plates by means of a laser beam. The strip width of the transfer foil is small, as referred to the printing-plate width, and the transfer foil is spooled from a supply roll on to a rewind roll by means of a ribbon transport device and, in the process, led between printing plate and laser head. In order to reach the complete image area of the printing plate, the plate cylinder is rotated under control and the ribbon transport device, together with the laser head, is moved under control over the width of the plate cylinder on a transversing unit.

In order to carry out a thermal transfer process, the individual rolls of ribbon have to be inserted manually into the ribbon transport or guide device and the ribbon has to be threaded manually around the guide rollers and fixed to the rewind roll. In the process, rotation of the thermal transfer ribbon can easily occur, as a result of which the thermal transfer process does not function, since the functional layer is turned away from the surface of the printing plate.

DE 198 11 030 A1 describes a thermal transfer ribbon having a number of tracks running parallel to one another, which is made up ready in a cassette. After running through a complete track length, the ribbon is spooled back and an unused track is aimed at the laser, so that a further image-setting operation can be performed. After a cassette has been used up, a higher-order administration system with appropriate control means provides a further one.

In such cassettes friction occurs between the transfer ribbon and guide parts, so that only limited ribbon speeds are possible and the ribbon wears easily or the functional layer is damaged.

On this basis, the object of the invention is to provide a cassette of simple construction for thermal transfer ribbon which permits high ribbon speeds and rules out wear on the transfer ribbon.

SUMMARY OF THE INVENTION

According to the invention, this object is achieved by a cassette that comprises a housing and at least first and second spools carried rotatably in the housing so that a thermal transfer ribbon can be passed between the spools in a spooling operation.

The spools are carried in the housing having a play with respect to spool mounting in the housing so that the spools are positionable with respect to the housing such that neither the spools nor the transfer ribbon come in contact with any housing part during the spooling operation.

As a result of the particularly advantageous configuration of the cassette, the thermal transfer ribbon can be transported completely decoupled from the housing, that is to say neither the ribbon nor the spools touch the housing during spooling. As a result, friction and electrostatic charges are prevented, as a result of which the functional layer is subjected neither to wear nor damage, and the thermal transfer process can run without being influenced. In addition, because of this decoupling, the thermal transfer ribbon can be transported at very high speeds (for example 6 m/s).

The ribbon can advantageously be ready-made for various printing-plate sizes, is protected against damage in the cassette, and the individual wear-free parts, such as the housing and the spools, can be reused repeatedly with unused thermal transfer ribbon.

As a result of ready-making the thermal transfer ribbon in the cassette, rotation of the ribbon during threading is ruled out and, by means of a cassette designed in accordance with the invention, an automated threading operation for the transfer ribbon into an image-setting device is made possible.

It is particularly advantageous that the cassette does not have to perform any ribbon guiding tasks and the cassette can therefore be constructed particularly simply. Neither bearings for the spools nor ribbon guide rollers are required on the cassette, which makes particularly economic production possible. This aspect is also advantageously assisted by assembling the housing from two identical half-housings.

The cassette provides a transport safeguard which prevents inadvertent unwinding but permits rewinding in order to tension the ribbon. This advantageous safeguard is preferably an integral constituent part of the housing of the cassette and may be released both manually and also automatically.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
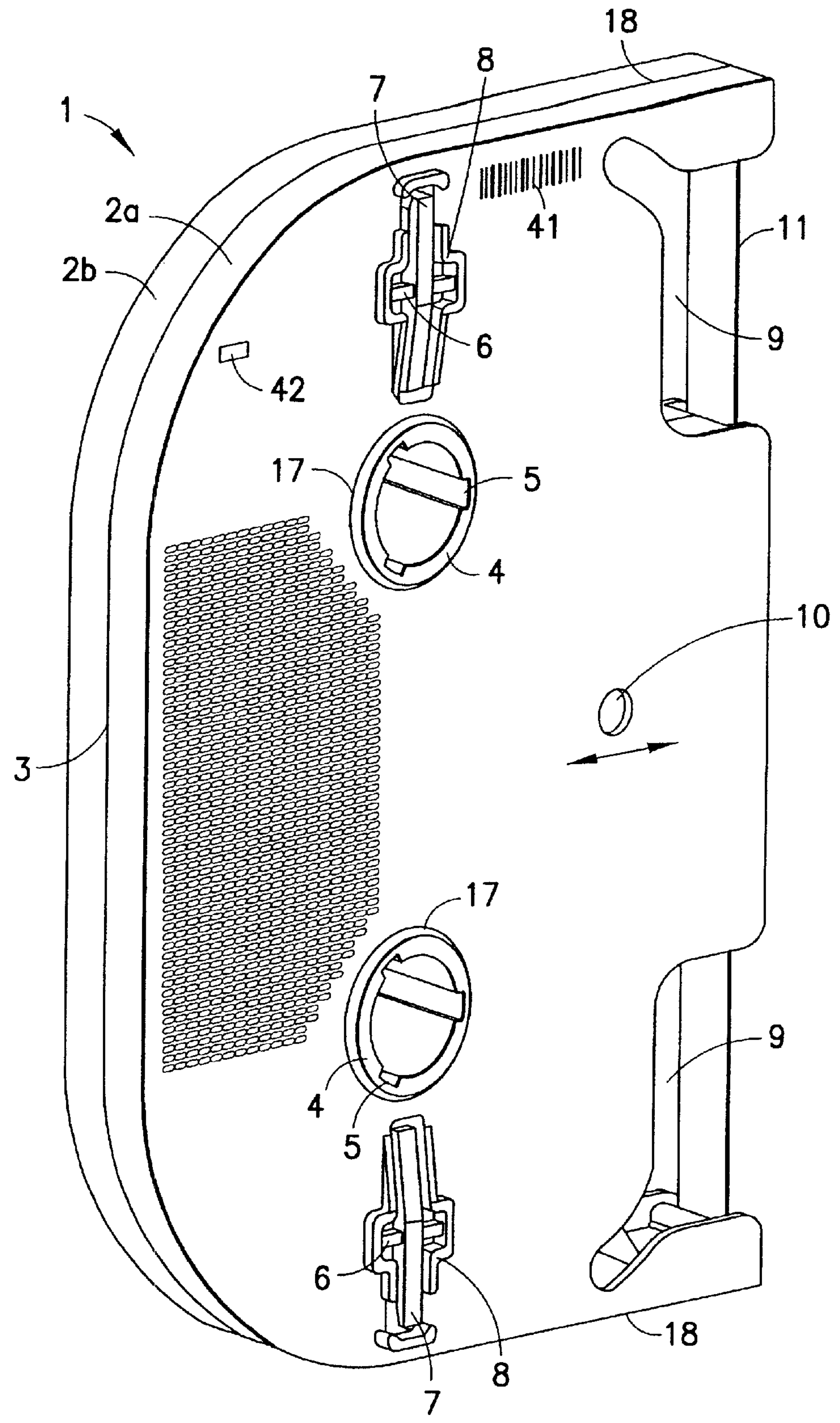
FIG. 1 is a perspective view of the cassette of the invention.

FIG. 1 shows an embodiment of the cassette 1 of the invention in the alignment in which it is inserted into a ribbon station for the laser-induced setting of images on printing cylinders. Such a ribbon station in which this cassette 1 is preferably used is extensively described in German application DE 100 23320.1 filed on May 12, 2000.

The cassette 1 shown comprises a housing 2, which is preferably assembled from two identical half-housing parts 2*a*, 2*b*, the half-housings being detachable one from the other along a dividing joint 3. On the housing 2, on the upper and lower sides, there are guide faces 18, on which the cassette 1 can be guided in a ribbon station and by means of which cassette vertical positioning within the ribbon station defined and fixed. The positioning of the cassette 1 in the horizontal direction within the insertion shaft of the ribbon station is carried out by means of a positioning opening 10 in side walls of the cassette 1. When the insertion shaft is closed, a cylindrical pin with a conical attachment engages in this positioning opening 10 and moves the cassette 1 with its conical outer surface into an intended position. The aligning movement which is brought about by the conical attachment of the pin is indicated by a double arrow underneath the positioning opening 10. The lateral positioning and fixing of the cassette 1 within the ribbon station is effected by fixed and sprung contact pins, which preferably act in pairs on the mutually opposite side faces of the cassette 1.

By means of these positioning and fixing devices, described by way of example, which are preferably located on a ribbon station, the cassette 1 can be moved into a predetermined position in all three spatial directions and can be fixed there. Of course, other means can also be used for this purpose.

Figure 2:
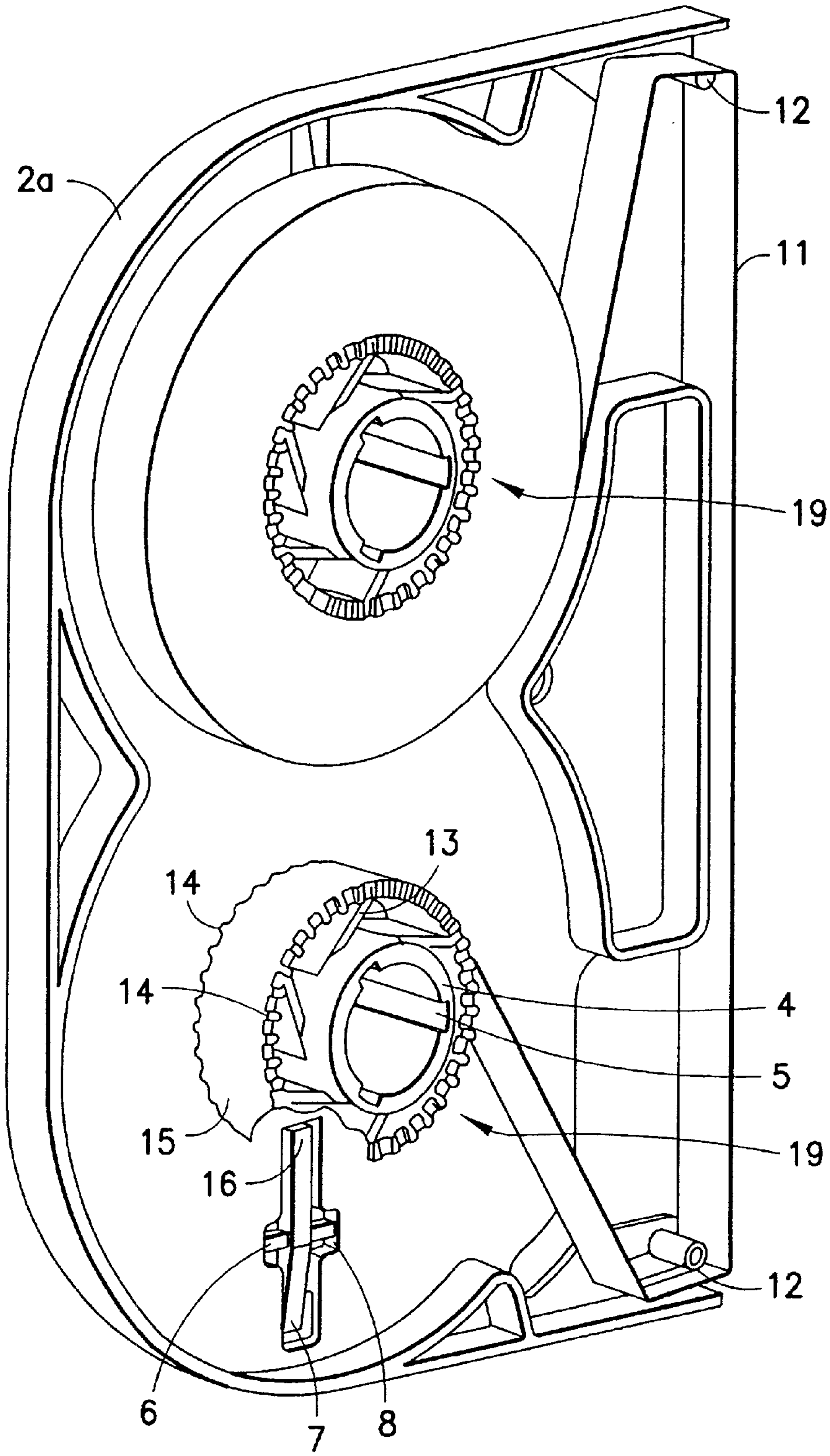
FIG. 2 is a perspective view of the cassette with one half housing thereof removed so the interior construction of the cassette is shown.

Provided on the side faces of the half-housings 2*a*, 2*b* are holes 17 through which the hubs 4 of spools 19, project out of the housing 2. These hubs 4 project beyond the side face on both sides of the housing 2 and have one or more grooves 5 which can receive drive shafts for rotating the spools. Connected to the hubs 4, via spokes 13, are drums 15, on which the thermal transfer ribbon 11 is wound in the interior of the cassette 1 as shown in FIG. 2. These spokes 13 act as springs which absorb the radially acting forces which are exerted on the hub 4 by the coil of ribbon. This advantageously prevents the hub 4 being compressed in the radial direction by these forces and therefore jamming on its holder. By means of the spokes 13, the winding forces are particularly advantageously de-coupled from the hole in the hub 4.

It is also possible to dispense with the drums 15 and to wind the thermal transfer ribbon 11 directly onto the hubs 4. In the case of such designs, jamming of the hub 4 on the holder must be prevented by other measures.

The hubs 4 have some play within the holes 17, so that they can be released in the radial direction with respect to the housing. Furthermore, the drums 15 inside the housing 2 can also be released in the axial direction with respect to the housing walls. This complete decoupling of the spools 19—in this exemplary embodiment comprising hub 4, spokes 13 and drum 15—is preferably provided by means of a ribbon station as described in DE 100 23320.1. For this purpose, the housing 2 of the cassette 1 is fixed in the ribbon station at a predetermined position, and the axes of the spools 19, as they are pushed onto the drive shafts, are moved into a radial position in which they are released over their entire circumference with respect to the holes 17. The drums 15 on which the thermal transfer ribbon 11 is spooled to and fro have some play within the housing 2 with respect to the side walls, that is to say in the axial direction.

In order to release the drums 15 laterally, so that the thermal transfer ribbon 11 touches neither of the two side walls, the hubs 4 are fixed on the drive shafts in a corresponding axial position. The ends of the hubs 4 are preferably pressed in a sprung manner against fixed stop faces on the drive shafts, which hold the drums 15 in a corresponding axially released position—with respect to the housing walls.

The respective clearances of the spools 19 in the radial and axial directions have to be adapted in accordance with the fabrication tolerances of the individual parts and the positioning accuracy of the ribbon station. The smaller the fabrication tolerances and the more accurate the positioning of the housing 2 with respect to the spools 19, the smaller the play of the spool 19 within the housing can be. The radial play should also not be selected to be so great that the thermal transfer ribbon 11 on a fully wound drum 15 can come into contact with webs within the housing 2 during the transport of the cassette 1, or a virtually empty drum 15 can fall through the hole 17. With a predefined ribbon width and a predefined lateral projection of the drums 15, the width of the housing 2 and of the hubs 4 also increases with greater lateral play, so that the result overall is less favourable relationships.

The embodiment of the cassette 1 shown in FIG. 1 has been produced from a plastic and, on each side wall of the housing 2, has riffling for secure manual gripping. For the secured transport and storage of cassettes 1 according the invention, an unwind lock is provided on the spools 19, which prevents inadvertent unwinding but permits the thermal transfer ribbon 11 to be tensioned.

For this purpose, in the exemplary embodiment described, each spool 19 has associated locking levers 7, which, within an aperture 8, are connected to the respective half-housing 2*a*, 2*b* at sprung pivots 6. It will be understood that the sprung pivots 6 normally impose a bias on the locking levers 7 tending to pivot the levers in a given direction. In the given direction in this instance is a pivoting of the tops of the levers inwardly of the housing, the bottoms of the levers moving outwardly relatively of the housing. A particularly advantageous configuration provides for two identical half-housings 2*a*, 2*b*, in which these locking levers 7 with their pivots 6 are an integral constituent part of the said half-housings and are moulded in the same fabrication step as the half-housings 2*a*, 2*b*. This embodiment requires only one injection-moulding tool, which makes more economical production possible.

The functioning of the unwind lock will be explained with reference to FIG. 2 which—as a 3-dimensional illustration—with the front half-housing 2*b* removed, permits a view into the interior of a cassette 1. It can be seen that the drums 15 are provided on both ends with locking teeth 14, in which a pawl 16 belonging to the locking lever 7 engages. A locking lever first end, i.e., the pawl carrying end normally is biased inwardly of the housing so the pawl 16 normally is engaged with teeth 14. The pawl 16, which has been made visible by breaking away part of the spool 19 in the drawing, is provided with a chamfer on the one run-on side of the locking teeth 14, so that the locking teeth 14 of the spools 19 force the pawl 16 away counter to the spring force from the pivot 6 and can be rotated in order to tension the thermal transfer ribbon 11. In the opposite direction of rotation, in order to unwind the thermal transfer ribbon 11, the locking teeth 14 are prevented from rotating on a straight face of the pawl 16. As already explained above, the housing 2 is preferably assembled from two identical half-housings 2*a*, 2*b* so that two opposite locking levers 7 act on each spool 19. Of course, it is also possible to provide locking levers 7 on only one side or else to incorporate other locking devices.

As a result of the locking levers 7 acting on the drums 15 in a sprung manner from both sides, the drums 15 can advantageously be centered between the housing inner walls, however, so that the thermal transfer ribbon 11 does not touch the said inner walls outside the ribbon station.

The locking levers 7 function in the same way as sprung rockers; in their rest positions, the pawls 16 engage in the locking teeth 14 on the drums 15 and block the direction of rotation for unwinding the thermal transfer ribbon 11. The end of the lever located opposite the pawl 16 projects outside beyond the housing side wall. By pressing this lever end in in the direction of the interior of the housing, the pawls 16 are each lifted out of engagement with the locking teeth 14, which also releases the direction of rotation in order to unwind the thermal transfer ribbon 11. This action of releasing the unwind lock can be carried out both manually and by machine. In order to release the unwind lock automatically by machine, strips can be provided on the ribbon station which automatically press in the projecting lever ends of the locking levers 7 as the cassette 1 is inserted or as the insertion shaft is closed.

By using FIG. 2, the course of the thermal transfer ribbon 11 inside the cassette 1 can be seen. The thermal transfer ribbon 11 is led from the upper, virtually fully wound spool 19, over an upper deflection rib 12, to the front end of the housing, from there is led downwards on the outside and, at a lower deflection rib 12, is guided into the interior again, to the lower, virtually empty, spool 19. At the upper and lower deflection rib 12, in each case a directional change of virtually 180° is performed on the thermal transfer ribbon 11, and the spools 19 are wound from the mutually facing inner sides. From the deflection ribs 12, the thermal transfer ribbon 11 takes the relatively long path to the drums 15, as a result of which guide rollers which are inserted into the cassette 1 by the ribbon station—in order to lift the thermal transfer ribbon 11 off the deflection ribs 12—are wrapped around with a relatively large angle and in this way ensure beneficial guidance.

During the image-setting operation, it is possible to travel over a number of tracks lying parallel to one another, so that the thermal transfer ribbon 11 has to be spooled repeatedly from the upper to the lower spool 19 and vice versa. A cassette 1 is able to accommodate a plurality of image-setting jobs one after another over the entire length of the thermal transfer ribbon 11, or to accommodate them beside one another on different tracks.

The cassettes 1 can be marked in a simple way, for example by means of a bar code 41 (FIG. 1), chip 42 (FIG. 1) or other means, and detected individually in a storage administration system for a plurality of cassettes, or in a ribbon station. As a result, any desired information, such as the jobs carried out, residual capacity, etc, for each cassette can be stored and called up again.

Figure 3:
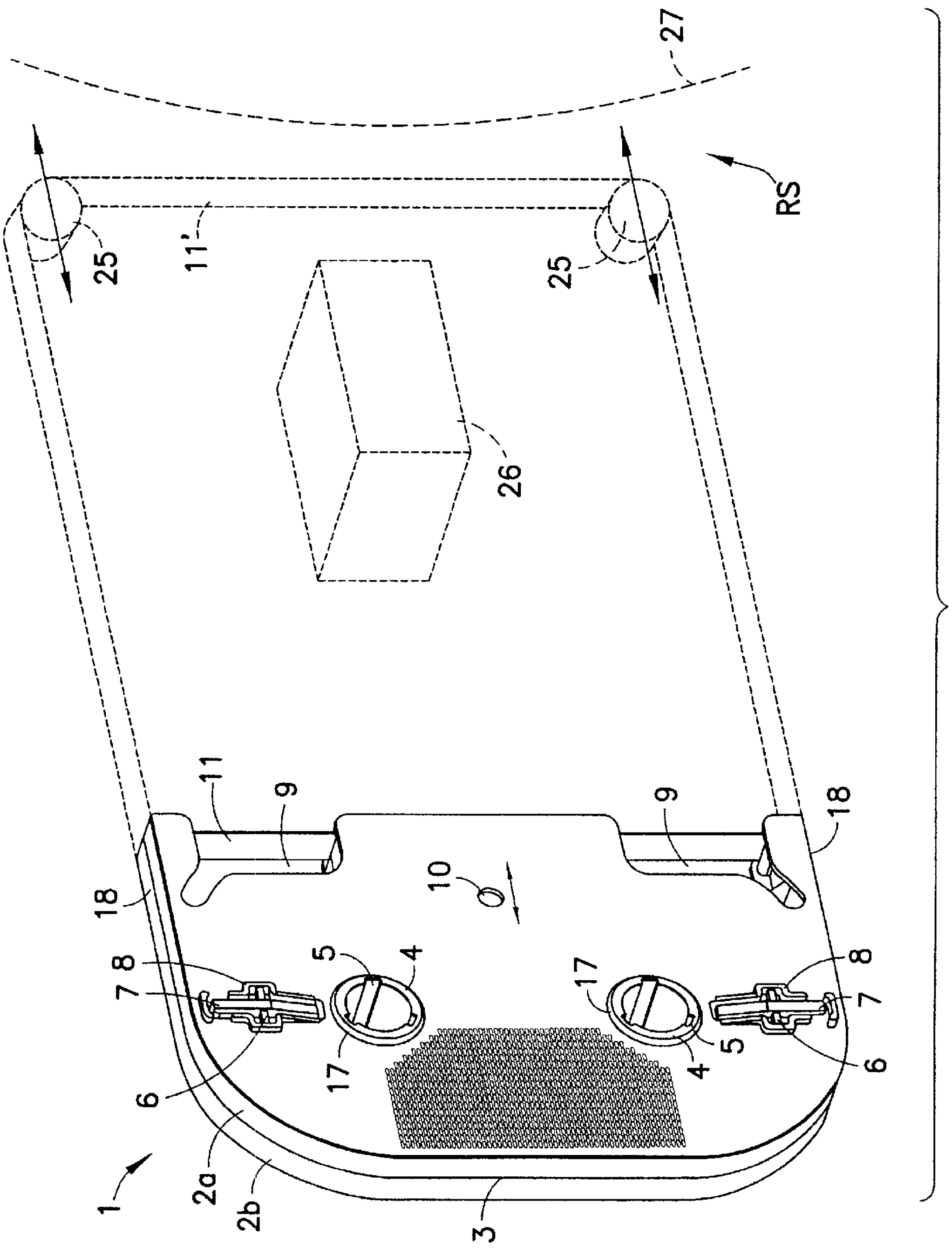
FIG. 3 depicts the cassette in a condition in which the thermal transfer ribbon is pulled out a distance therefrom.

In FIG. 3, the exemplary embodiment explained of a cassette 1 configured in accordance with the invention is shown schematically during an image-setting operation when the cassette is mounted at a ribbon station. Two guide rollers 25 have been moved laterally into the housing 2 through the upper and lower cutouts 9, and have pulled the thermal transfer ribbon 11' out of the cassette 1 and led it up against the circumferential face of a plate cylinder 27. Further guide rollers (not illustrated) are pivoted partly into the housing 2, within both cutouts 9, after the thermal transfer ribbon 11' has been pulled out, and guides the thermal transfer ribbon 1 inside the housing 2 past the deflection ribs 12, which can be seen in FIG. 2. In this pulled-out position, the thermal transfer ribbon 11' is positioned laterally over a laser 26 and the entire arrangement can be traversed over the image width of the plate cylinder 27 by means of a ribbon station RS. The thermal transfer ribbon 11 is preferably provided with a functional layer only on the side facing the plate cylinder 27.

Since the pull-out position of the thermal transfer ribbon 11 is to be shown only schematically in FIG. 3, details of the positioning and fixing of the cassette 1 at the ribbon station or handling same as well as details on the drive to the spools 19 are not shown, as these are extensively described in DE 100 23320.1.

A substantial core of the invention is based on the fact that the cassette holds the thermal transfer ribbon on spools which are completely decoupled from the housing, which is to be understood as including the fact that neither the spools nor the ribbon itself touch the cassette housing during the image-setting process. This avoids friction and electrical charging resulting from this, as well as wear of the functional layer and of the substrate material of the thermal transfer ribbon, which ensures a more favourable course of the image-setting process. The cassette therefore constitutes mechanical protection for the thermal transfer ribbon, without performing any kind of guide tasks during a thermal transfer process.

In all the embodiments of cassettes according to the invention, the spools must be coordinated with respect to the housing in such a way that, together with the thermal transfer ribbon, they have play in every direction within the housing, and can be moved into a mutually decoupled position and held there by external positioning and fixing means. For this purpose, appropriate spools together with housings must be used which, as referred to the play between the two parts, permit adequately accurate positioning and fixing.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A cassette for holding a thermal transfer ribbon, comprising:

a housing; and at least first and second spools carried rotatably in said housing so that said transfer ribbon can be passed between said spools in a spooling operation, said spools being carried in the housing with play with respect to the housing so that the spools are releasable in an axial and radial direction with respect to the housing and said housing providing access for receipt of guide rollers for decoupling the transfer ribbon from the housing, such that neither said spools nor the transfer ribbon passing between said spools come in contact with any part of said housing during the spooling operation.

2. A cassette according to claim 1, wherein said housing has guide faces thereon and positioning openings therein for effecting three spatial direction guidance, positioning and fixing of the housing, said spools having hubs, said housing including holes in each of opposite housing sides through which said spool hubs project outwardly of the housing.

3. A cassette according to claim 2, wherein said hubs include at least one drive shaft receptive groove therein.

4. A cassette according to claim 2, comprising means for absorbing radially acting ribbon winding force components acting on the spools whereby said force components are decoupled from force transmitting relationship with the spool hubs.

5. A cassette according to claim 1, comprising a releasable unwind lock associated with each of said spools.

6. A cassette according to claim 1, wherein said housing is an assembly of two identical half-housing parts detachable one from another along a dividing joint, said half-housing parts having cutouts at which the thermal transfer ribbon is accessible to guide means for effecting automatic threading of said ribbon when the cassette is mounted at a ribbon station.

7. A cassette according to claim 6, wherein each of said spools is provided with locking levers as integral parts of said half-housing parts and disposed at apertures in said half-housing parts.

8. A cassette according to claim 1, wherein the housing and said spools are made of a thermoplastic material.

9. A cassette according to claim 1, wherein the thermal transfer ribbon passing between the spools has a plurality of information tracks thereon.

10. A cassette according to claim 9, wherein said tracks follow one after another over the length of said ribbon.

11. A cassette according to claim 9, wherein said tracks are arranged parallel alongside one another on said ribbon.

12. A cassette according to claim 9, wherein an information identification marking of one of a bar code and a chip is carried on said cassette.

13. A cassette according to claim 1, wherein when the cassette is mounted at a ribbon station, the thermal transfer ribbon is moveable outwardly a distance of the housing to a ribbon pulled out position for positioning said ribbon laterally over a laser head.

14. A cassette for holding a thermal transfer ribbon, comprising:

a housing;

at least first and second spools carried rotatably in said housing so that said transfer ribbon can be passed between said spools in a spooling operation, said spools being carried in the housing with play with respect to the housing so that the spools are positionable with respect to the housing such that neither said spools nor a transfer ribbon passing between said spools come in contact with any part of said housing during the spooling operation;

a releasable unwind lock associated with each of said spools, wherein said unwind lock comprises a locking lever sprung pivoted on said housing so that a first end of said locking lever normally is biased inwardly of the housing, said locking lever first end including a pawl, the associated spool having locking teeth thereon, said pawl normally engaging said locking teeth for locking said spool against rotation in one direction.

* * * * *